H. B. MEECH.

Assignor to B. F. BROWN.

Manufacture of Paper-Pulp from Wood.

No. 8,256. Reissued May 28, 1878.

*WITNESSES*

Wm A Skinkle

Roberdeau Buchanan.

*INVENTOR*

Harrison, B. Meech,

*By his Attorneys*

Baldwin, Hopkins & Peyton

UNITED STATES PATENT OFFICE.

HARRISON B. MEECH, OF CHATHAM VILLAGE, NEW YORK, ASSIGNOR TO BENJAMIN F. BROWN.

IMPROVEMENT IN THE MANUFACTURE OF PAPER-PULP FROM WOOD.

Specification forming part of Letters Patent No. 106,710, dated August 23, 1870; Reissue No. 8,256, dated May 28, 1878; application filed May 7, 1878.

DIVISION A.

*To all whom it may concern:*

Be it known that I, HARRISON B. MEECH, formerly of Fort Edward, in the county of Washington and State of New York, now residing at Chatham Village, New York, have invented a new and useful Machine for Reducing Wood to Pulp; and that the following, taken in connection with the drawings, is a full, clear, and exact description thereof.

Figure 1:
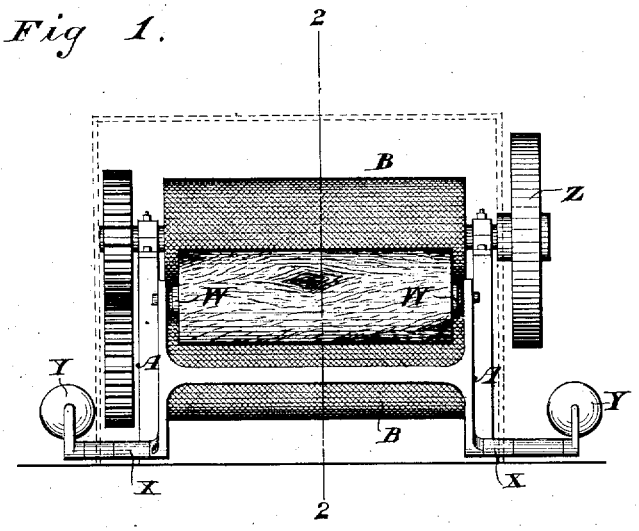
Figure 2:
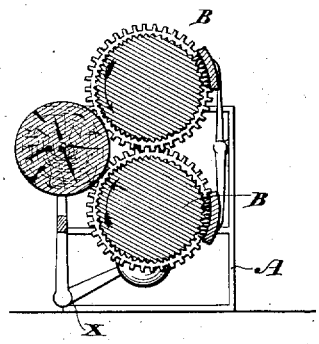
Figure 3:
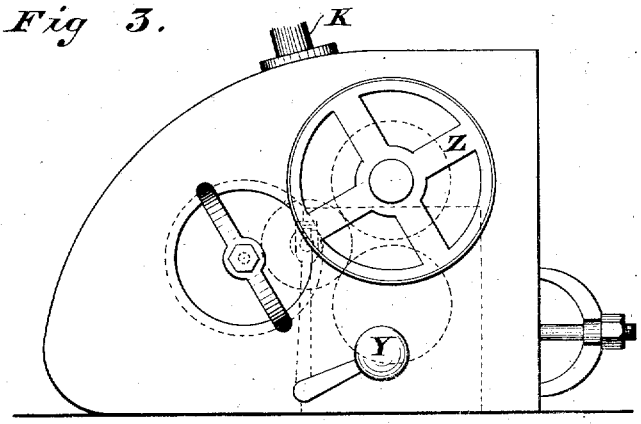
Figure 4:
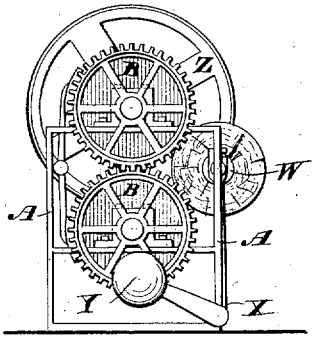
Figure 5:
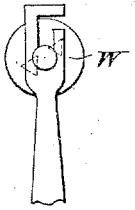
Figure 6:
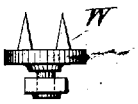

In the drawings, Figure 1 is a front elevation, and Fig. 2 a vertical transverse section therethrough on the line 2 2 of Fig. 1. Fig. 3 is an end elevation of a tight box or vessel in which the machine may be inclosed. Fig. 4 is an end elevation of that end of the machine upon which the gearing is mounted. Figs. 5 and 6 are detached views of dogs for supporting the wood.

The machine consists of two rollers, B B, made of iron, having their surfaces picked or roughened like the surface of a file, so as to bruise or grind off the fiber instead of cutting it. These rollers are to be mounted side by side in a frame, A, so that they nearly touch each other, with their journals resting in suitable journal-boxes. These rollers are geared together, as shown in the drawings, so that they revolve in opposite directions when put in motion by means of a belt on the pulley Z. The block or billet of wood to be ground (which I prefer to have about two feet long) has dogs W driven into each end of it, and these dogs rest (see Fig. 5) in slits in the ends of bent levers framed together and oscillating in journals X. Weights Y are applied to the other ends of these levers, and these weights force the wood against the grinding-surface of the two rollers, so that when the machine is in operation the wood will be reduced to pulp. The log may be revolved in either direction while being ground.

In Fig. 3 the machine is shown as inclosed in a steam-tight vessel provided with proper man-holes or doors for the entrance of wood and the discharge of pulp, and steam may be admitted into this vessel through the pipe K, or be let on between the log or billet and the grinding-surface of the two rollers while grinding, so as to soften the wood and facilitate the grinding.

I am aware of the fact that two crushing-rollers, smooth-faced, mounted and geared together as mine are, have been employed for crushing sugar, &c.; and that smooth-surface rollers revolving at unequal velocities have been employed for extending and loosening apart the fibers of pieces of wood fed to and passing between them; but I do not know that two rollers provided with grinding-surfaces have ever been employed to grind a substance pressed against both at the same time.

I therefore claim as of my own invention—

The combination of two rollers (each having a grinding-surface) mounted in a frame in such relation to each other as is described, and capable of operating to reduce wood to pulp, substantially as herein described.

HARRISON B. MEECH.

Witnesses:

ALEX. PORTER BROWNE,
J. HENRY TAYLOR.